(12) United States Patent
Harz et al.

(10) Patent No.: US 7,285,592 B2
(45) Date of Patent: Oct. 23, 2007

(54) PIGMENTS DISPERSIONS BASED ON WATER AND ACRYLATE

(75) Inventors: Andreas Harz, Schwalbach (DE); Heidemarie Menzel, Bad Soden (DE); Hans-Tobias Macholdt, Darmstadt-Eberstadt (DE); Michael Mueller, Hattersheim-Okriftel (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 354 days.

(21) Appl. No.: 10/484,142

(22) PCT Filed: Jul. 12, 2002

(86) PCT No.: PCT/EP02/07794

§ 371 (c)(1), (2), (4) Date: Jan. 16, 2004

(87) PCT Pub. No.: WO03/008510

PCT Pub. Date: Jan. 30, 2003

(65) Prior Publication Data

US 2004/0171738 A1 Sep. 2, 2004

(30) Foreign Application Priority Data

Jul. 19, 2001 (DE) ................. 101 35 140

(51) Int. Cl.
- C08L 33/06 (2006.01)
- C08L 33/08 (2006.01)
- C08L 33/10 (2006.01)
- C08L 25/08 (2006.01)
- C09D 11/10 (2006.01)

(52) U.S. Cl. ............ 524/560; 524/577; 523/160

(58) Field of Classification Search ........ 523/160, 523/161

See application file for complete search history.

(56) References Cited

U.S. PATENT DOCUMENTS

| | | | |
|---|---|---|---|
| 2,802,715 A | 8/1957 | Hofer et al. | |
| 4,529,787 A | 7/1985 | Schmidt et al. | |
| 5,180,584 A * | 1/1993 | Sebag et al. | 510/122 |
| 5,268,197 A * | 12/1993 | Pons et al. | 427/221 |
| 5,607,808 A * | 3/1997 | Nishizawa et al. | 430/137.19 |
| 5,658,376 A * | 8/1997 | Noguchi et al. | 106/31.43 |
| 5,913,971 A * | 6/1999 | Fujimatsu et al. | 106/31.86 |
| 6,011,098 A * | 1/2000 | Kashiwazaki et al. | 524/377 |
| 6,051,645 A * | 4/2000 | Suzuki et al. | 524/500 |
| 6,099,627 A | 8/2000 | Shigeo et al. | |
| 6,114,411 A * | 9/2000 | Nakamura et al. | 523/161 |
| 6,183,548 B1 * | 2/2001 | Erdtmann et al. | 106/31.48 |
| 6,241,814 B1 * | 6/2001 | Urban et al. | 106/497 |
| 6,245,832 B1 * | 6/2001 | Suzuki et al. | 523/160 |
| 6,309,782 B1 * | 10/2001 | Ohtsu et al. | 430/7 |
| 6,656,657 B2 * | 12/2003 | Patel et al. | 430/137.14 |
| 6,746,114 B2 * | 6/2004 | Takahashi et al. | 347/100 |
| 2003/0034249 A1 * | 2/2003 | Akutsu et al. | 204/499 |

FOREIGN PATENT DOCUMENTS

| | | |
|---|---|---|
| CH | 283986 | 6/1952 |
| CH | 324665 | 10/1957 |
| EP | 0049785 | 4/1982 |
| EP | 0712912 | 5/1996 |
| EP | 0716072 | 6/1996 |
| GB | 1308163 A * | 2/1973 |
| GB | 2349153 | 10/2000 |
| JP | 2000351931 A * | 12/2000 |

OTHER PUBLICATIONS

Machine Translation of JP 2000-351931 (2000).*
Billmeyer, Jr. Fred W.; Textbook of Polymer Science 3rd Edition, John Wiley And Sons, New York, 1984 (p. 211).*

* cited by examiner

*Primary Examiner*—Callie Shosho
(74) *Attorney, Agent, or Firm*—Richard P. Silverman

(57) ABSTRACT

The invention relates to an aqueous pigment preparation containing an organic and/or inorganic pigment dispersed in an acrylate resin solution and a dispersion agent. The preparation is characterised in that the acrylate resin is a copolymer consisting essentially of between 50 and 80 mol % of monoalkenyl aromatic compounds and between 20 and 50 mol % of acrylates, and has an average molar mass $M_v$ of between 1,000 and 50,000 g/mol, and in that the dispersion agent is a compound of formula (I): $R-O-(CH_2-CH_2-O)_m-CH_2-COOM$, wherein R is a $C_{10}-C_{20}$ alkyl radical or a $C_{10}-C_{20}$ alkenyl radical, m is a number between 1 and 15, and M is a monovalent cation.

16 Claims, No Drawings

PIGMENTS DISPERSIONS BASED ON WATER AND ACRYLATE

The present invention relates to waterborne pigment preparations, to processes for preparing them, to their use for dyeing and printing natural and synthetic fiber materials, to recording liquids, especially for the inkjet process, and to electrophotographic toners, powder coating materials, and color filters.

The inkjet process is a contactless printing process in which droplets of the recording liquid are guided from one or more nozzles onto the substrate that is to be printed. In order to obtain prints of high definition and resolution, the recording liquids and the colorants present therein are required to meet stringent requirements, especially with regard to purity, fineness of particles, stability on storage, viscosity, surface tension, and conductivity. Very stringent requirements are imposed in particular on color strength, shade, brilliance, and fastness properties, such as light fastness, water fastness, and rub fastness, for example. High light fastness in particular is of great importance for exterior inkjet applications and for the production of inkjet prints with photographic quality.

The development of dyes which exhibit the desired combination of shade, brilliance, color strength, light fastness, and water fastness has so far proven very difficult, with the consequence that increasing interest is being focused on pigmented inks.

Pigmented inkjet preparations known to date often fail to meet the requirements the inkjet industry imposes on them, exhibiting deficiencies in fine division, in thermal stability and in storage stability, and also often poor printability, especially in thermal printers.

One important quality criterion of an inkjet preparation is its flocculation stability. In order not to clog the nozzles, the pigment particles must be smaller than 0.5 μm, preferably smaller than 0.1 μm. Moreover, crystal growth or particle agglomeration must be effectively prevented. This is generally achieved using certain dispersing aids. When an inkjet ink is printed, it flows at high speed through the nozzles. As a result of shearing and the effect of temperature, the stabilizing dispersing aid is often removed from the pigment surface. The pigment flocculates and clogs the nozzles of the printer. Another quality feature of an inkjet ink is its storage stability; in the course of storage, the pigment particles must not agglomerate to form larger particles.

It is therefore an object of the invention to provide pigment preparations which satisfy the aforementioned requirements in respect of fine division, thermal stability, storage stability, printability, and coloristics.

This object has been achieved, surprisingly, by dispersing the pigment in a special, water-soluble acrylate resin, defined below, in combination with a special dispersing aid. When the acrylate resin is used alone, the resulting pigment preparations have excellent storage properties, but the printability of the ink is inadequate. Similarly, the use of other dispersing aids in combination with the acrylate resin leads to pigment preparations lacking printability and stability on storage. The addition of the dispersing aid of the invention results in a poorer solubility of the acrylate resin in the liquid, so that the adsorption equilibrium of the resin is shifted positively in favor of the surface of the pigment. This prevents removal of additives under shearing, at high flow rate in the fine nozzles of the printer, from the surface of the pigment.

The present invention provides an aqueous pigment preparation, comprising an organic and/or inorganic pigment dispersed in an acrylate resin solution and dispersing aid, wherein the acrylate resin is a copolymer composed essentially of from 50 to 80 mol % of monoalkenyl aromatics and from 20 to 50 mol % of acrylates and has an average molar mass $M_v$ of between 1 000 and 50 000 g/mol and wherein the dispersing aid is a compound of the formula (I)

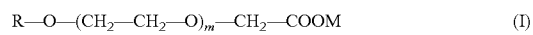

$$R-O-(CH_2-CH_2-O)_m-CH_2-COOM \qquad (I)$$

in which

R is a $C_{10}$-$C_{20}$ alkyl radical or a $C_{10}$-$C_{20}$ alkenyl radical, m is a number from 1 to 15, and M is a monovalent cation.

By monoalkenyl aromatics are meant, in particular, monomers from the group consisting of styrene, α-methylstyrene, vinyltoluene, tert-butylstyrene, and o-chlorostyrene, and also mixtures thereof.

By acrylates are meant monomers from the group consisting of acrylic acid, methacrylic acid, and esters of acrylic or methacrylic acid. Examples include the following: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octyl methacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate, and also the corresponding esters of acrylic acid.

The acrylate resin is preferably composed of from 60 to 70 mol % of monoalkenyl aromatics and from 30 to 40 mol % of acrylates. Particular preference is given to acrylate resins composed of the monomers styrene and (meth)acrylic acid.

The average molar mass, $M_v$ determined by gel permeation chromatography, is preferably from 5 000 to 25 000 g/mol. The acrylate resins used in accordance with the invention have an acid number of preferably between 110 and 250, in particular between 190 and 220, mg KOH/g acrylate resin;

a glass transition temperature, Tg, of preferably from 40 to 140° C., more preferably from 50 to 140° C., e.g., from 110 to 140° C.;

a polydispersity of preferably from 1.5 to 3.5, more preferably from 1.5 to 2.5, in particular from 2.0 to 2.4;

a density at 25° C. of preferably from 1.05 to 1.3 g/cm³, in particular from 1.1 to 1.2 g/cm³; and a melting range of preferably from 120 to 160° C.

The acrylate resin is advantageously used in alkaline aqueous solution or ammoniacal solution, preferably as a solution with a concentration of from 1 to 35% by weight, in particular from 5 to 30% by weight.

The acrylate resins described above can be prepared in accordance with U.S. Pat. No. 4,529,787.

The acrylate resin copolymer used in accordance with the invention may include small amounts, such as from 0.5 to 2 mol %, for example, of a surface-active compound capable of polymerization.

The dispersing aid of the formula (I) is preferably a compound in which R is $C_{12}$-$C_{18}$ alkyl or $C_{12}$-$C_{18}$ alkenyl, especially $C_{13}$-$C_{16}$ alkyl or $C_{13}$-$C_{16}$ alkenyl. The number m is preferably from 1 to 10.

The monovalent cation M is preferably hydrogen, an alkali metal, especially Na or K, or ammonium.

Examples of compounds of the formula (I) are:

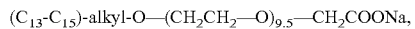
($C_{13}$-$C_{15}$)-alkyl-O—(CH$_2$CH$_2$—O)$_{9.5}$—CH$_2$COONa,

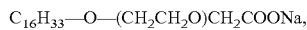
$C_{16}H_{33}$—O—(CH$_2$CH$_2$O)CH$_2$COONa,

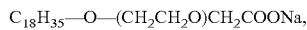
$C_{18}H_{35}$—O—(CH$_2$CH$_2$O)CH$_2$COONa,

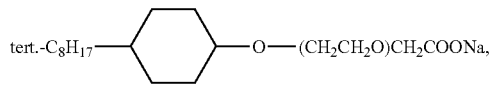
tert.-$C_8H_{17}$—⟨hexyl⟩—O—(CH$_2$CH$_2$O)CH$_2$COONa,

$C_{18}H_{35}$—O—(CH$_2$CH$_2$O)$_8$—CH$_2$COONa,

$C_{18}H_{37}$—O—(CH$_2$CH$_2$O)—CH$_2$COONa.

Compounds of this kind are known from CH-A-324 665 and CH-A-283 986.

Particularly suitable organic pigments include monoazo, disazo, laked azo, β-naphthol, naphthol AS, benzimidazolone, disazo condensation, azo metal complex pigments, and polycyclic pigments such as, for example, phthalocyanine, quinacridone, perylene, perinone, thiazinine indigo, thioindigo, anthanthrone, anthraquinone, flavanthrone, indanthrone, isoviolanthrone, pyranthrone, dioxazine, quinophthalone, isoindolinone, isoindoline, and diketopyrrolopyrrole pigments or carbon blacks.

Examples of suitable inorganic pigments include titanium dioxides, zinc sulfides, iron oxides, chromium oxides, ultramarine, nickel or chromium antimony titanium oxides, cobalt oxides, and bismuth vanadates.

The pigments used should be very finely divided, with preferably 95% and with particular preference 99% of the pigment particles possessing a size ≦500 nm. The average particle size is preferably <200 nm. Depending on the pigment used, the morphology of the pigment particles may vary widely, and accordingly the viscosity behavior of the pigment preparations may vary widely as a function of the particle shape. To obtain a favorable viscosity behavior for the preparations, the particles should preferably have a cuboid or spherical shape. Purified pigments are preferably used. A selection of particularly preferred organic pigments includes carbon black pigments, such as gas blacks or furnace blacks, for example; monoazo, disazo, and benzimidazolone pigments, especially the Colour Index pigments Pigment Yellow 17, Pigment Yellow 74, Pigment Yellow 83, Pigment Yellow 97, Pigment Yellow 120, Pigment Yellow 128, Pigment Yellow 139, Pigment Yellow 151, Pigment Yellow 155, Pigment Yellow 180, Pigment Yellow 213, Pigment Red 57:1, Pigment Red 146, Pigment Red 176, Pigment Red 184, Pigment Red 185 or Pigment Red 269; phthalocyanine pigments, especially the Colour Index pigments Pigment Blue 15, Pigment Blue 15:3 or Pigment Blue 15:4, and quinacridone pigments, especially the Colour Index pigments Pigment Red 122 or Pigment Violet 19.

The weight ratio between the pigment and acrylate resin is preferably from 1:0.05 to 1:1, in particular from 1:0.2 to 1:0.5.

The ratio of pigment to dispersant of the formula (I) is preferably from 1:0.05 to 1:1, in particular from 1:0.2 to 1:0.5.

Preferred pigment preparations are composed of
a) from 5 to 50% by weight, preferably from 15 to 25% by weight, of pigment,
b) from 0.25 to 20% by weight, preferably from 1 to 10% by weight, of the acrylate resin,
c) from 1 to 12% by weight, preferably from 2 to 8% by weight, of a compound of the formula (I),
d) from 5 to 60% by weight, preferably from 10 to 40% by weight, of water,
e) from 0 to 10% by weight, preferably from 0.1 to 5% by weight, of an organic solvent,
f) from 0 to 15% by weight, preferably from 5 to 9% by weight, of a hydrotropic substance,
g) from 0 to 10% by weight, preferably from 0.5 to 9.5% by weight, of further customary additives, based in each case on the total weight of the pigment preparation.

The solvents present in the pigment preparations described above may comprise an organic solvent or a mixture of such solvents. Suitable solvents are, for example, monohydric or polyhydric alcohols, their ethers and esters, e.g., alkanols, especially those having from 1 to 4 carbon atoms, such as methanol, ethanol, propanol, isopropanol, butanol or isobutanol, for example; dihydric or trihydric alcohols, especially those having from 2 to 5 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether; ketones and ketone alcohols, such as acetone, methyl ethyl ketone, diethyl ketone, methylisobutyl ketone, methyl pentyl ketone, cyclopentanone, cyclohexanone, and diacetone alcohol, for example; amides such as dimethylformamide, dimethylacetamide and N-methylpyrrolidone, and also toluene and n-hexane.

Water used for preparing the pigment preparations is employed preferably in the form of distilled or deionized water.

Examples of hydrotropic compounds, which may where appropriate also serve as solvents, that can be used include formamide, urea, tetramethylurea, ε-caprolactam, ethylene glycol, diethylene glycol, triethylene glycol, polyethylene glycol, butylglycol, methyl cellosolve, glycerol, n-methylpyrrolidone, 1,3-diethyl-2-imidazolidinone, thiodiglycol, sodium benzenesulfonate, Na xylenesulfonate, Na toluenesulfonate, sodium cumenesulfonate, Na dodecylsulfonate, Na benzoate, Na salicylate or sodium butyl monoglycol sulfate.

The pigment preparations of the invention may further comprise customary additives, examples being preservatives, cationic, anionic or nonionic surface-active substances (surfactants and wetting agents), and viscosity regulators, e.g., polyvinyl alcohol, cellulose derivatives, or water-soluble natural or synthetic resins as film formers and/or binders for enhancing the adhesion and abrasion resistance.

Amines, such as ethanolamine, diethanolamine, triethanolamine, N,N-dimethyl-ethanolamine or diisopropylamine, for example, serve primarily to raise the pH of the pigment preparation, especially inkjet ink. They are normally present at from 0 to 10% by weight, preferably from 0.5 to 5% by weight, in the pigment preparation and the inkjet ink prepared from it.

The present invention also provides a process for preparing such pigment preparations, which comprises finely dispersing the pigment in the acrylate resin solution and the dispersing aid of the formula (I) using a dispersing apparatus, preferably a stirred ball mill, which is operated with a peripheral stirrer speed of more than 12 m/s, employing nonmetallic grinding media with a diameter of less than or equal to 1 mm, in the presence of water. The remaining additives may be present during fine division and/or may be added subsequently. The acrylate resin is advantageously used in the form of an aqueous solution, as described above.

The invention further provides for the use of the pigment preparations of the invention as colorants for inks, especially inkjet inks, electrophotographic toners, especially addition-polymerization toners, powder coated materials, and color filters.

The pigment preparations of the invention are suitable as colorants in electrophotographic toners and developers, such as one- or two-component powder toners (also called one- or two-component developers), magnetic toners, liquid toners, addition-polymerization toners, and further, specialty toners.

Typical toner binders are addition-polymerization resins, polyaddition resins, polycondensation resins, such as styrene, styrene-acrylate, styrene-butadiene, acrylate, polyester or phenol epoxy resins, polysulfones, polyurethane, individually or in combination, and also polyethylene and polypropylene, which may include yet further ingredients, such as charge control agents, waxes, or flow aids, or may have these added to them subsequently.

The preparations of the invention are further suitable as colorants in powders and powder coating materials, especially in triboelectrically or electrokinetically sprayed powder coating materials which are used for surface coating articles made, for example, of metal, wood, plastic, glass, ceramic, concrete, textile material, paper or rubber.

As powder coating materials use is made typically of epoxy resins, carboxyl- and hydroxyl-containing polyester resins, polyurethane resins, and acrylic resins, together with customary hardeners. Combinations of resins are also employed. For instance, epoxy resins are frequently used in combination with carboxyl- and hydroxyl-containing polyester resins. Typical hardener components are, for example, acid anhydrides, imidazoles and also dicyandiamide and their derivatives, capped isocyanates, bisacylurethane, phenolic and melamine resins, triglycidyl isocyanurates, oxazolines, and dicarboxylic acids.

The preparations of the invention are also suitable as colorants for color filters, and also for both additive and subtractive color generation.

By inkjet inks are meant not only waterborne inks (including microemulsion inks) but also nonaqueous (solvent-based) inks, and inks which operate in accordance with the hotmelt process.

Microemulsion inks are based on organic solvents, water, and, where appropriate, an additional hydrotropic substance (interface mediator). Inks on a nonaqueous basis comprise essentially organic solvents and, where appropriate, a hydrotropic substance.

The present invention additionally provides inkjet recording liquids containing generally from 0.5 to 15% by weight, preferably from 1.5 to 8% by weight, of the pigment preparation of the invention, based on the total weight of the recording liquid.

Microemulsion inks consist essentially of from 0.5 to 15% by weight, preferably from 1.5 to 8% by weight, of the pigment preparation of the invention, from 5 to 99% by weight of water, and from 0.5 to 94.5% by weight of organic solvent and/or hydrotropic compound.

Solvent-based inkjet inks consist essentially of from 0.5 to 15% by weight of the pigment preparation of the invention and from 85 to 94.5% by weight of an organic solvent and/or hydrotropic compound. Carrier materials for solvent-based inkjet inks may be polyolefins, natural rubber and synthetic rubber, polyvinyl chloride, vinyl chloride-vinyl acetate copolymers, polyvinyl butyrates, wax/latex systems or combinations thereof, which are soluble in the "solvent".

Hotmelt inks are based predominantly on organic compounds, such as waxes, fatty acids, fatty alcohols or sulfonamides, which are solid at room temperature and become liquid on heating, the preferred melting range being situated between about 60° C. and about 140° C. The invention also provides a hotmelt inkjet ink consisting essentially of from 20 to 90% by weight of wax, from 1 to 10% by weight of the pigment preparation of the invention, from 0 to 20% by weight of the additional polymer (as "dye dissolver"), from 0 to 5% by weight of dispersing aid, from 0 to 20% by weight of viscosity modifiers, from 0 to 20% by weight of plasticizers, from 0 to 10% by weight of tack additive, from 0 to 10% by weight of transparency stabilizer (which prevents, for example, crystallization of the waxes), and from 0 to 2% by weight of antioxidant.

The inkjet inks of the invention can be prepared by dispersing the pigment preparation of the invention into the microemulsion medium or into the aqueous or nonaqueous medium or into the wax for preparing a hotmelt inkjet ink.

The invention further provides a set of pigment preparations that includes at least one colorant preparation in each of the colors black, cyan, magenta, and yellow, wherein at least one of the preparations corresponds to the preparation of the invention.

Preference is given in this context to a set of pigment preparations whose black preparation includes carbon black as colorant, especially a gas black or furnace black; whose cyan preparation includes a pigment from the group of the phthalocyanine pigments, especially the Colour Index pigments Pigment Blue 15, Pigment Blue 15:3 or Pigment Blue 15:4; whose magenta dispersion includes a pigment from the group of the quinacridones, preferably Colour Index Pigment Red 122 or Colour Index Pigment Violet 19, or from the group of the monoazo, disazo, isoindoline or benzimidazolone pigments, especially the Colour Index pigments Pigment Red 57:1, Pigment Red 146, Pigment Red 176, Pigment Red 184, Pigment Red 185 or Pigment Red 269; and whose yellow preparation includes preferably a pigment from the group of the monoazo, disazo, isoindoline or benzimidazolone pigments, especially the Colour Index pigments Pigment Yellow 17, Pigment Yellow 74, Pigment Yellow 83, Pigment Yellow 97, Pigment Yellow 120, Pigment Yellow 128, Pigment Yellow 139, Pigment Yellow 151, Pigment Yellow 155, Pigment Yellow 180 or Pigment Yellow 213.

The invention further provides a set of printing inks that includes at least one printing ink in each of the colors black, cyan, magenta, and yellow, wherein at least one of the printing inks comprises the pigment preparation of the invention in dilute or undiluted form with or without further additives.

In addition to the printing of paper, natural and synthetic fiber materials, films, and plastics, inkjet inks may also be employed on glass, ceramic, concrete, and the like.

EXAMPLES

In the examples below the acrylate solution used comprises an acrylate resin characterized by the following features:

Copolymer of 60-70 mol % of monostyrene, 30-40 mol % of acrylic acid.

| | |
|---|---|
| Specif. mass: | 1 150 kg/m$^3$ |
| Acid number: | 214 |
| Glass transition temperature: | 128° C. |
| Molar mass: | 17 250 g/mol |
| Melting range: | 140-150° C. |
| Polydispersity: | 2.3 |

The acrylate solution itself is composed of 25% by weight of the acrylate, 3.9% by weight of NaOH, and 71.9% by weight of water.

Example 1

Pigment Preparation with Pigment Blue 15:3 for Inkjet Inks 20 parts C.I. Pigment Blue 15:3
25 parts acrylate solution
5 parts dispersant: R—O—(CH$_2$CH$_2$O)$_{9.5}$—CH$_2$COONa where R=C$_{13}$-C$_{15}$ alkyl
15 parts propylene glycol
0.2 part preservative
and 34.8 parts water are homogenized using a dissolver.

The suspension is subsequently ground using a stirred ball mill (Drais model PML) with zirconium mixed oxide grinding media, diameter 0.3-0.4 mm. The resulting pigment preparation is adjusted with water to a pigment content of 20%.

The pigment preparation possesses excellent fluidity, stability of viscosity, and flawless flocculation stability when stored at room temperature and 60° C. for one month. Aqueous dilutions of this pigment concentrate, at 3%, are likewise flocculation stable.

Example 2

Pigment Preparation with Pigment Red 122 for Inkjet Inks

A preparation containing
20 parts C.I. Pigment Red 122
10 parts acrylate solution
3 parts dispersant: R—O—(CH$_2$CH$_2$O)$_{9.5}$—CH$_2$COONa where R=C$_{13}$-C$_{15}$ alkyl
15 parts propylene glycol
0.2 part preservative
51.8 parts water is prepared as described in example 1.

Example 3

Pigment Preparation with Pigment Yellow 155 for Inkjet Inks

A preparation containing
20 parts C.I. Pigment Yellow 155
25 parts acrylate solution
5 parts dispersant: R—O—(CH$_2$CH$_2$O)$_{9.5}$—CH$_2$COONa where R=C$_{13}$-C$_{15}$ alkyl
15 parts propylene glycol
0.2 part preservative
34.8% water is prepared as described in example 1.

Example 4

Pigment Preparation with Pigment Yellow 180 for Inkjet Inks

A preparation containing
20 parts C.I. Pigment Yellow 180
25 parts acrylate solution
5 parts dispersant: C$_{18}$H$_{35}$O(CH$_2$CH$_2$O)$_{12}$CH$_2$COONa
15 parts propylene glycol
0.2 part preservative
34.8 parts water is prepared as described in example 1.

Example 5

Pigment Preparation with Pigment Yellow 74 for Inkjet Inks

A preparation containing
20 parts C.I. Pigment Yellow 74
25 parts acrylate solution
5 parts dispersant: C$_{18}$H$_{35}$O(CH$_2$CH$_2$O)$_{12}$CH$_2$COONa
15 parts propylene glycol
0.2 part preservative
34.8 parts water is prepared as described in example 1.

Example 6

Pigment Preparation with Pigment Yellow 151 for Inkjet Inks

A preparation containing
20 parts C.I. Pigment Yellow 151
25 parts acrylate solution
5 parts dispersant: C$_{18}$H$_{35}$O(CH$_2$CH$_2$O)$_{12}$CH$_2$COONa
15 parts propylene glycol
0.2 part preservative
34.8 parts water is prepared as described in example 1.

Example 7

Pigment Preparation with Pigment Yellow 151 for Inkjet Inks

A preparation containing
20 parts PV Fast Yellow H2G
25 parts acrylate solution 3 parts dispersant: $C_{18}H_{35}O(CH_2CH_2O)_{12}CH_2COONa$
15 parts propylene glycol
0.2 part preservative
36.8 parts water is prepared as described in example 1.

Example 8

Pigment Preparation with Pigment Black 7 for Inkjet Inks

A preparation containing
20 parts Pigment Black 7
25 parts acrylate solution
7 parts dispersant: $C_{18}H_{35}O(CH_2CH_2O)_{12}CH_2COONa$
15 parts propylene glycol
0.2 part preservative
39.8 parts water is prepared as described in example 1.

Example 9

Pigment Preparation with Pigment Black 7 for Inkjet Inks

A preparation containing
20 parts Pigment Black 7
25 parts acrylate solution
15 parts propylene glycol
7 parts dispersant: $C_{18}H_{35}O(CH_2CH_2O)_{12}CH_2COONa$
0.2 part preservative
32.8 parts water is prepared as described in example 1.

The pigment preparations prepared in the examples above are outstandingly suitable as inkjet inks. The viscosity remains stable both at room temperature and on 4 weeks of storage at 60° C. The particle size distribution of the pigment is stable even on storage and under thermal loads. In the inkjet inks, there is no flocculation of the pigment particles or clogging of the nozzles.

The invention claimed is:

1. A set of colorant preparations comprising at least one colorant preparation in each of the colors black, cyan, magenta, and yellow, wherein at least one of the colorant preparations is an aqueous pigment preparation wherein the aqueous pigment preparation is an organic and/or inorganic pigment dispersed in an acrylate resin solution and a dispersing aid, wherein the acrylate resin is a copolymer consisting essentially of from 50 to 80 mol % of a monoalkenyl aromatic and from 20 to 50 mol % of acrylate and has an average molar mass $M_v$ of between 1 000 and 50 000 g/mol, and wherein the dispersing aid is a compound of the formula (I)

$$R\text{—}O\text{—}(CH_2\text{—}CH_2\text{—}O)_m\text{—}CH_2\text{—}COOM \quad (I)$$

in which
R is a $C_{10}$-$C_{20}$ alkyl radical or a $C_{10}$-$C_{20}$ alkenyl radical
m is a number from 1 to 15, and
M is a monovalent cation and wherein the pigment preparation consists essentially of
a) from 5 to 50% by weight of the pigment,
b) from 0.25 to 20% by weight of the acrylate resin,
c) from 1 to 12% by weight of a compound of the formula (I),
d) from 5 to 60% by weight of water,
e) from 0 to 10% by weight of an organic solvent,
f) from 0 to 15% by weight of a hydrotropic substance, and
g) from 0 to 10% by weight of at least one additive,
based in each case on the total weight of the pigment preparation,
wherein the acrylate is a methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate and tetrahydropyranyl (meth)acrylate, or a combination thereof.

2. The set of colorant preparations as claimed in claim 1, wherein the acrylate resin is a copolymer of from 60 to 70 mol % of the monoalkenyl aromatic and from 30 to 40 mol % of the acrylate.

3. The set of colorant preparations as claimed in claim 1, wherein the monoalkenyl aromatic is a monomer selected from the group consisting of styrene, α-methylstyrene, vinyltoluene, tert-butylstyrene, o-chlorostyrene, and a combination thereof.

4. The set of colorant preparations as claimed in claim 1, wherein the organic pigment is a monoazo, disazo, laked azo, β-naphthol, naphthol AS, benzimidazolone, disazo condensation or azo metal complex pigment or a polycyclic pigment.

5. The set of colorant preparations as claimed in claim 1, wherein the weight ratio between the pigment and the acrylate resin is from 1:0.05 to 1:1.

6. A set of colorant preparations as claimed in claim 1, wherein
the pigment of the black colorant preparation is a carbon black,
the pigment of the cyan colorant preparation is selected from the group consisting of phthalocyanine pigments,
the pigment of the magenta colorant preparation is a pigment selected from the group consisting of quinacridone pigments or a pigment selected from the group consisting of monoazo, disazo, isoindoline and benzimidazolone pigment, and
the pigment of the yellow colorant preparation is selected from the group consisting of the monoazo, disazo, isoindoline and benzimidazolone pigment.

7. A printing ink comprising a set of colorant preparations as claimed in claim 1.

8. The set of colorant preparation as claimed in claim 1, wherein the pigment of the black colorant preparation is a gas black or furnace black, the pigment of the cyan colorant preparation is a pigment selected from the group consisting of Colour Index P. Blue 15, P. Blue 15:3 and P. Blue 15:4, the pigment of the magenta colorant preparation is a pigment selected from the group consisting of Colour Index P. Red 122 or P. Violet 19, P. Red 57:1, P. Red 146, P. Red 176, P. Red 184, P. Red 185 and P. Red 269, and the pigment of the yellow colorant preparation is a pigment selected from the group consisting of Colour Index P. Yellow 17, P. Yellow 74, P. Yellow 83, P. Yellow 97, P. Yellow 120, P. Yellow 128, P. Yellow 139, P. Yellow 151, P. Yellow 155, P. Yellow 180, and P. Yellow 213.

9. An electrophotographic toner comprising a colorant, wherein the colorant includes a pigment preparation, wherein the pigment preparation is an organic and/or inorganic pigment dispersed in an acrylate resin solution and a dispersing aid, wherein the acrylate resin is a copolymer consisting essentially of from 50 to 80 mol % of monoalkenyl aromatics and from 20 to 50 mol % of an acrylate and has an average molar mass, $M_v$ of between 1 000 and 50 000 g/mol, and wherein the dispersing aid is a compound of the formula (I)

$$R\text{---}O\text{---}(CH_2\text{-}CH_2\text{---}O)_m\text{---}CH_2\text{---}COOM \quad (I)$$

in which

R is a $C_{10}$-$C_{20}$ alkyl radical or a $C_{10}$-$C_{20}$ alkenyl radical, m is a number from 1 to 15, and M is a monovalent cation and wherein the pigment preparation consists essentially of a) from 5 to 50% by weight of the pigment, b) from 0.25 to 20% by weight of the acrylate resin, c) from 1 to 12% by weight of a compound of the formula (I), d) from 5 to 60% by weight of water, e) from 0 to 10% by weight of an organic solvent, f) from 0 to 15% by weight of a hydrotropic substance, and g) from 0 to 10% by weight of at least one additive based in each case on the total weight of the pigment preparation, wherein the acrylate is a methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate and tetrahydropyranyl (meth)acrylate, or a combination thereof.

10. The electrophotographic toner as claimed in claim 9, wherein the electrophotographic toner is an addition polymerization toner.

11. A color filter comprising a colorant, wherein the colorant includes a pigment preparation, wherein the pigment preparation is an organic and/or inorganic pigment dispersed in an acrylate resin solution and a dispersing aid, wherein the acrylate resin is a copolymer consisting essentially of from 50 to 80 mol % of monoalkenyl aromatics and from 20 to 50 mol % of an acrylate and has an average molar mass, $M_v$ of between 1 000 and 50 000 g/mol, and wherein the dispersing aid is a compound of the formula (I)

$$R\text{---}O\text{---}(CH_2\text{---}CH_2\text{---}O)_m\text{---}CH_2\text{---}COOM \quad (I)$$

in which

R is a $C_{10}$-$C_{20}$ alkyl radical or a $C_{10}$-$C_{20}$ alkenyl radical, m is a number from 1 to 15, and M is a monovalent cation and wherein the pigment preparation consists essentially of a) from 5 to 50% by weight of the pigment, b) from 0.25 to 20% by weight of the acrylate resin, c) from 1 to 12% by weight of a compound of the formula (I), d) from 5 to 60% by weight of water, e) from 0 to 10% by weight of an organic solvent, f) from 0 to 15% by weight of a hydrotropic substance, and g) from 0 to 10% by weight of at least one additives based in each case on the total weight of the pigment preparation, wherein the acrylate is a methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N. N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate and tetrahydropyranyl (meth)acrylate, or a combination thereof.

12. A pigment preparation, consisting essentially of:

a) from 15 to 25% by weight of pigment, b) 1 to 10% by weight of an acrylate resin, wherein the acrylate resin is a copolymer consisting essentially of from 50to 80 mol % of monoalkenyl aromatics and from 20 to 50 mol % of acrylates and has an average molar mass $M_v$ of between 1 000 and 50 000 p/mol c) from 2 to 8% by weight of a compound of the formula (I)

$$R-O-(CH_2-CH_2-O)_m-CH_2-COOM \quad (I)$$

in which

R is a $C_{10}$-$C_{20}$ alkyl radical or a $C_1$-$C_{20}$ alkenyl radical, m is a number from 1 to 15, and M is a monovalent cation.

d) from 10 to 40% by weight of water, e) 0.1 to 5% by weight of an organic solvent f) from 5 to 9% by weight of a hydrotropic substance and g) from 0.5 to 9.5% by weight, of at least one additive based in each case on the total weight of the pigment preparation wherein the acrylate is a methyl (meth)acrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (math)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, crotyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate and tetrahydropyranyl (meth)acrylate, or a combination thereof.

13. The pigment preparation as claimed in claim 12, wherein the acrylate resin is a copolymer of from 60 to 70 mol % of the monoalkenyl aromatic and from 30 to 40 mol % of the acrylate.

14. The pigment preparation as claimed in claim 12, wherein the monoalkenyl aromatic is a monomer selected from the group consisting of styrene, α-methylstyrene, vinyltoluene, tert-butylstyrene, o-chlorostyrene, and a combination thereof.

15. The pigment preparation as claimed in claim 12, wherein the organic pigment is a monoazo, disazo, laked azo, β-naphthol, naphthol AS, benzimidazolone, disazo condensation or azo metal complex pigment or a polycyclic pigment.

16. The pigment preparation as claimed in 12, wherein the weight ratio between the pigment and the acrylate resin is from 1:0.05 to 1:1.

* * * * *